United States Patent [19]

Hoehn

[11] Patent Number: 5,519,536

[45] Date of Patent: May 21, 1996

[54] WARNING DEVICE FOR DISPLAYING INFORMATION IN A VEHICLE

[75] Inventor: Wolfgang Hoehn, Rüsselsheim, Germany

[73] Assignee: VDO Adolf Schindling AG, Frankfurt, Germany

[21] Appl. No.: 236,959

[22] Filed: May 2, 1994

[30] Foreign Application Priority Data

Jun. 16, 1993 [DE] Germany .......................... 43 19 904.6

[51] Int. Cl.⁶ ........................ G02B 21/14; G03B 21/00
[52] U.S. Cl. ........................ 359/630; 353/13; 353/14
[58] Field of Search .............................. 359/630, 15, 13; 345/7, 9; 353/13, 14, 46

[56] References Cited

U.S. PATENT DOCUMENTS

| | | | |
|---|---|---|---|
| 4,832,427 | 5/1989 | Nanba | 359/618 |
| 4,999,012 | 3/1991 | Suzuki | 353/14 |
| 5,044,709 | 9/1991 | Smith | 359/630 |
| 5,121,099 | 6/1992 | Hegg | 359/630 |
| 5,243,448 | 9/1993 | Banbury | 359/13 |
| 5,371,510 | 12/1994 | Miyauchi | 359/13 |

*Primary Examiner*—Georgia Y. Epps
*Assistant Examiner*—Ricky Mack
*Attorney, Agent, or Firm*—Martin A. Farber

[57] ABSTRACT

A warning device for displaying information in a vehicle, particularly a motor vehicle, the warning device having a display of the information presented as a virtual image in a visible region of the windshield of the vehicle. In order to make certain that a warning information is transmitted with great persistence to the party to be warned, the invention provides that the information be mirrored into the windshield on a larger scale within increasing intensity of warning.

14 Claims, 2 Drawing Sheets

WARNING DEVICE FOR DISPLAYING INFORMATION IN A VEHICLE

FIELD AND BACKGROUND OF THE INVENTION

The present invention relates to a warning device for displaying information (22, 23) in a vehicle (6), the warning device having a display (11) presenting information (22, 23) of which is mirrored as virtual image within a visible region (4) of a windshield (5) of the vehicle (6).

Such warning devices, which are developed in the manner of a head-up display, are used, in particular, in automotive vehicles. So-called head-up displays without projection optics employ a region of the windshield which is provided with a reflective coating as mirror (combiner) in which the information is superimposed on the picture of the outer world. The information appears in this connection directly behind the windshield, and therefore in the near region of the accommodation of the eye. Head-up displays with projection optics use lens systems, mirror systems, or else holographic-optical elements in order to convert the information to be shown into a virtual image which can be produced at different distances in front of the eye of the observer. The distance at which the virtual image appears is, in principle, not limited, but the visibility of the virtual display for the driver, which is determined by the dimensions of the projection optics, is. It is known in this connection to use a display in the form of a programmable LCD dot matrix and to employ a holographic combiner on the windshield for the display of the information in the visual field.

In the known warning devices different car-related and environment-related information is displayed, which information, is not variable.

SUMMARY OF THE INVENTION

It is an object of the present invention so to develop a warning device of the type indicated that its warning information is transmitted to the person to be warned with great persistence.

According to the invention, in a warning device of the aforementioned type, the information (22, 23) is imaged on a larger scale with increasing intensity of the warning.

In accordance with the invention, in this way the information of interest is in each case transmitted unchanged to the person to be warned, but the image is enlarged with increasing intensity of the warning, in other words, the area of the windshield required for the information takes up a larger space. The person to be warned thus recognizes that he and/or his vehicle is subject to increased danger.

The expression "vehicle" has been selected here in order to indicate that the use of the warning device of the invention is comprehensive and thus not limited to automobiles, aircraft, ships, etc.

One preferred field of use of the warning device of the invention is as a distance warning, i.e. to indicate the distance of the vehicle from an object. There is considered here, in particular, the indicating of the distance of an automobile from another car traveling in front of it. The information may, for instance, represent a vehicle visible from the rear by the driver of the car, the rear contour of said vehicle being shown in larger size with increasing closeness between the two cars. However, there may also be considered, for instance, an imaged traffic sign bearing the legend "Caution Congested Traffic" which is shown in larger size with increasing closeness to the preceding vehicle or the end of the congestion. As the preceding car moves away, the information can either be shown on a smaller scale or the display of the information can be dispensed with.

It is considered particularly advantageous if the information (22, 23) is shown with increasing intensity of warning on a scale which increases continuously with the intensity of the warning. The information is thus not transmitted to the observer with jumps in the scale but with a continuous change in the scale. It can also be provided that the information (22, 23) is shown in a different color as the intensity of the warning increases.

As information there enters into consideration, not only information with regard to the distance of the vehicle from another object, but also general information concerning the condition of operation of the vehicle. What is in mind here is, for instance the amount of gas in the gas tank; if a minimum level is reached, then information to this effect is shown on an initial scale in the visible region of the windshield and upon further decrease in the level of the gas, the scale of the showing is increased. The motor temperature, the amount of oil, the oil pressure, the servicing intervals, etc. can be shown in corresponding manner.

Depending on the structural expense desired, the display may be a freely programmable display or a static display (11). The static display can be developed, for instance as a diapositive, the imaging of which thus corresponds to the information to be displayed. On the other hand, a freely programmable display makes it possible to indicate the most different types of information by means of the display.

In accordance with a special embodiment of the invention, a translucent additional display (19) is arranged in the ray path between the display (11) and the windshield (5). This further display (19) is superimposed on the first-mentioned display so that the virtual image can be composed of these two displays. It is deemed advantageous for the further display to have a grid, for instance a showing of a travel path with distance scale, in particular within a range of 50 to 200 meters. If the first display, for instance a car or a warning sign, is shown on a relative scale by the first-mentioned display, the information of this display appears in the virtual image within the relatively distant region of the space scale, while the information which is reproduced by the first-mentioned display, moves with reproduction on a larger scale, into the front region of the distance scale and thus closer to the driver.

The reproduction of the information on a larger scale can be effected in various manners, for instance optically or electronically. A preferred development provides that a lens system (14) is arranged between the display (11) and the windshield (5), the change in the imaging scale of the information (22, 23) being effected by a displacement of the lens system (14) relative to the display (11) or by a displacement within the lens system.

The lens system (14) can be movable, for instance, by means of an adjustment drive (15). In line with this, it is possible to support the lens system (14) in displaceable fashion within a housing (12), the housing (12) receiving a display developed as diapositive (11) behind which at least one source of light (10) is arranged and the adjustment drive (15) being mounted in the housing (12). The housing (12) is preferably mounted in the instrument panel (8).

The invention also provides a use of the warning device for indicating the distance of the vehicle (6) from an object, particularly the distance of an automobile (6) from another automobile traveling in front of it.

BRIEF DESCRIPTION OF THE DRAWINGS

With the above and other objects and advantages in view, the present invention will become more clearly understood in connection with the detailed description of preferred embodiments, when considered with the accompanying drawing, of which.

DETAILED DESCRIPTION OF THE PREFERRED EMBODIMENT

Figure 1:
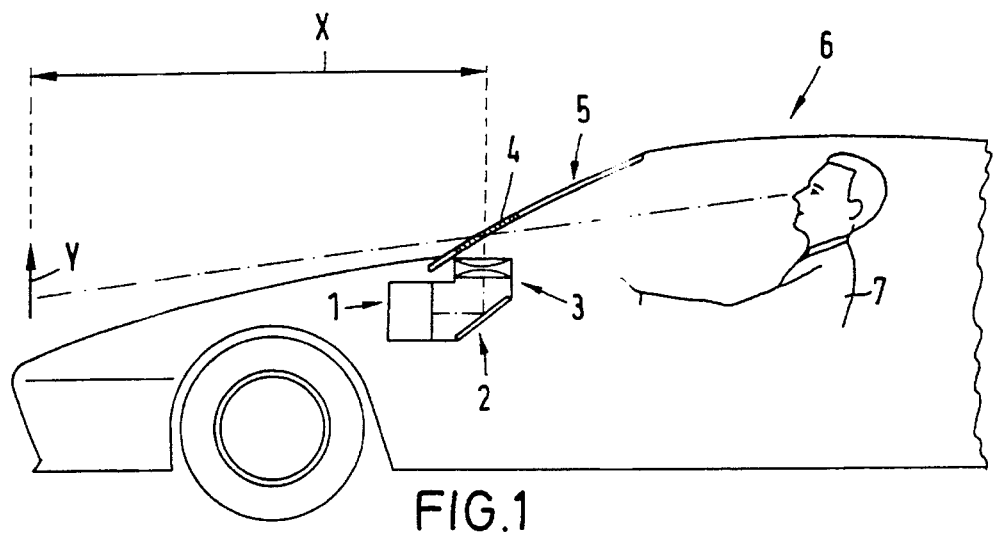
FIG. 1 shows the basic construction of a head-up display in a motor vehicle.

FIG. 1 is a side view, greatly simplified, of a motor vehicle. In the region of the instrument panel, there is a warning device which consists of a display unit 1, for instance an LCD with illumination, a mirror 2, and an imaging optical system 3. The information of the display unit 1 reflected via the mirror 2 and the imaging optics 3 into a treated region 4 of the windshield 5 of the motor vehicle 6. FIG. 1 shows that the driver 7 sees a virtual image y in the ray path of the treated region 4 at a virtual distance x in front of said region. The virtual distance x is about 2 meters.

Figure 2:
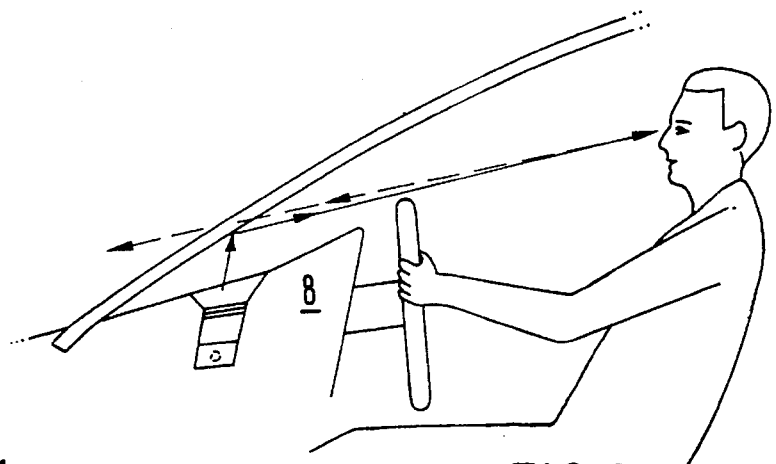
FIG. 2 is a head-up display in use in accordance with FIG. 1, the head-up display having a display with lens system.
Figure 3:
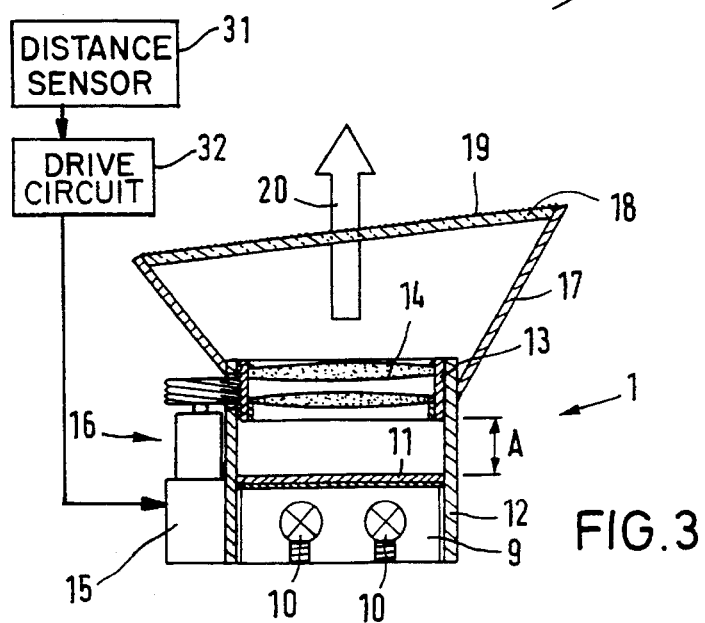
FIG. 3 is an enlarged showing of the display with lens system of FIG. 2.

FIGS. 2 and 3 shown an illustrative development of the display 1 which is arranged in a recess in the instrument panel 8. The display 1 has a light box 9 containing two incandescent bulbs 10. The region of the light box 9 facing the windshield 5 is developed as a diapositive 11. The light box 1 is inserted into a housing 12 which, within its end region facing the windshield 5, receives a threaded bushing 13 which, in its turn, receives a lens system 14. By means of a servomotor 15 which is mounted in the housing 12 and a gearing 16 which cooperates with said motor, the lens system 14 can be is moved towards and away from the windshield 5 in the direction indicated by the double-ended arrow A. The end of the housing 12 facing the windshield 5 receives an adapter 17 which is provided with a cover glass 18. The latter is printed with a static grid 19. When the display unit 1 is in operation, the two incandescent bulbs 10 illuminate the diapositive 11 from the rear and the information of said diapositive is sent in the direction of the arrow 20 through the lens system 14 and brought onto the treated partial region 4 of the windshield 5; in addition, the information of the grid 19 applied on the cover glass 18 is superimposed on the information of the diapositive 11. While the information of the grid design 12 is static, the information of the diapositive 11 is shown changed in scale or in size by means of the servomotor 15.

Figure 4:
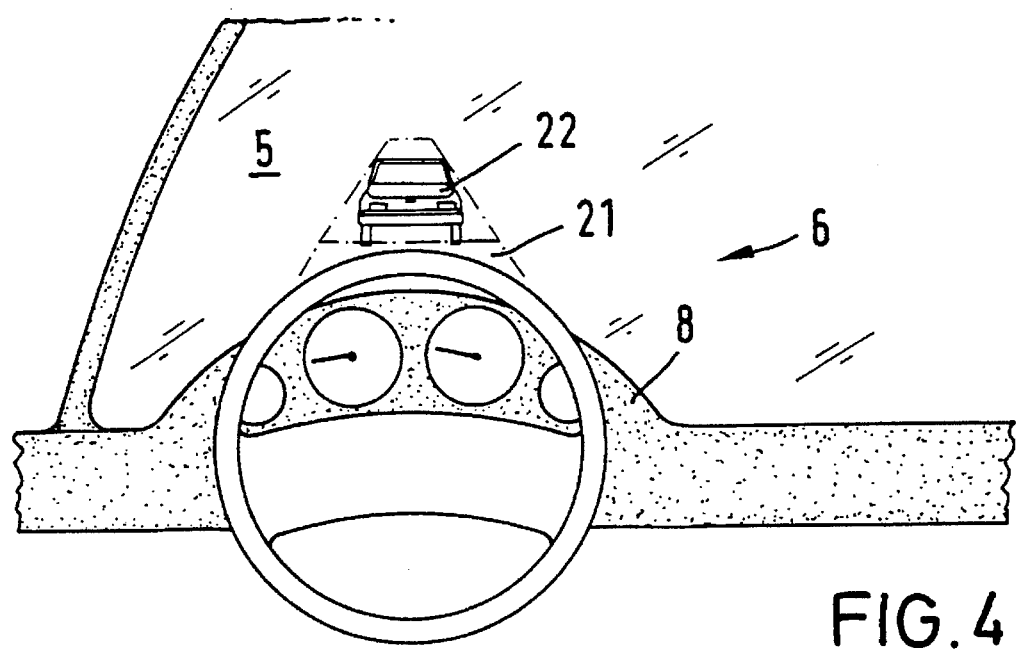
FIG. 4 is a first virtual image shown by means of the warning device, seen from the position of the driver.

FIG. 4 shows the virtual picture produced by the diapositive 11 and the grid 19. The grid 19 shows a roadway 21 with distance scale, while the rear view of a passenger car is projected via the diapositive 11 onto the roadway 21. Upon a change in the distance between the vehicle having the warning device and the vehicle in front of it, sensors, known from the prior art, determine the existing distance between the vehicles and, corresponding to the distance apart at the time, control the lens system 14 via the servomotor 15, with the result that, upon a decrease in the distance between the two vehicles, the vehicle 22 is shown enlarged with respect to the roadway 21 which remains unchanged. A shown in FIG. 3, a distance sensor 31 outputs a distance signal to a drive circuit 32, the later outputting a motor control signal to the servomotor 15. With increasing enlargement of the vehicle 22, the car can also be shown more intensively in color. This can be accomplished for example, by providing instead of the light box 9 described, an LCD which cooperates with the lens system 14.

Figure 5:
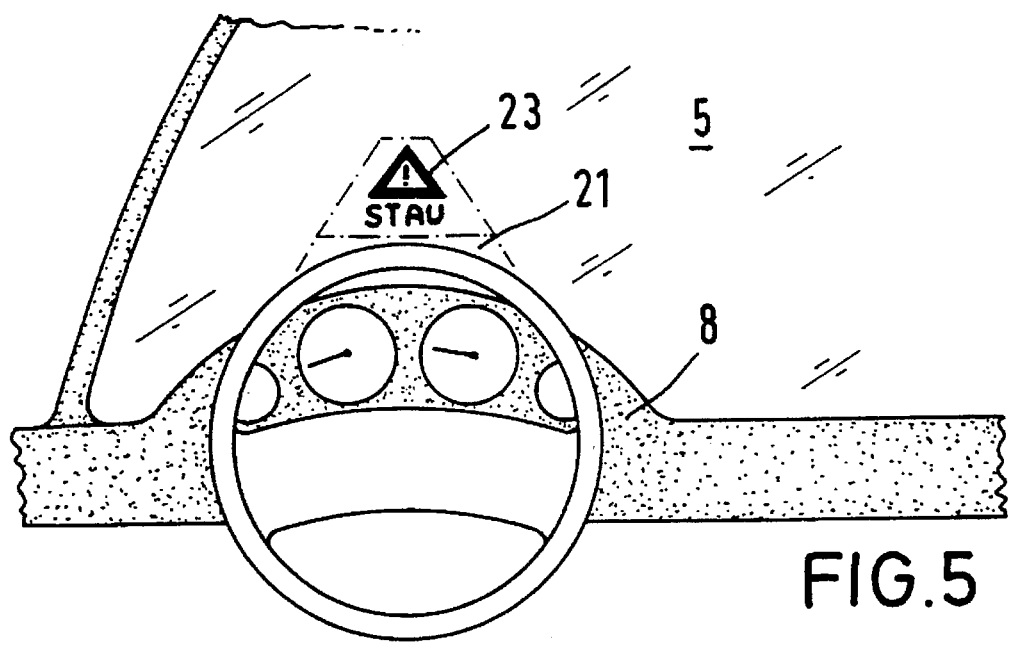
FIG. 5 is another possible virtual image, seen from a position corresponding to FIG. 4.

FIG. 5 shows that instead of an automobile 22, a warning sign bearing a written warning, which is reproduced by the reference number 23, can be provided. With decreasing distance between the car and a preceding car, and thus increasing intensity of warning, the traffic sign is shown with its legend enlarged in the field of view of the driver, thus advising the driver of a threatening danger.

I claim:

1. A warning device for displaying information in a vehicle, the warning device having a display providing information which is mirrored as a virtual image within a visible region of a windshield of the vehicle; and means for changing the size of said virtual image, allowing the information to be imaged on a larger scale with increasing intensity of a warning.

2. A warning device according to claim 1, wherein the information is shown with increasing intensity of warning on a scale with increases continuously with the intensity of the warning.

3. A warning device according to claim 1, wherein the information is shown in a different color as the intensity of the warning increases.

4. A warning device according to claim 1, wherein the display permits information presented on the display to be varied.

5. A warning device according to claim 1, wherein the display is a static display.

6. A warning device according to claim 1, further comprising a lens system arranged between the display and the windshield, a change in the imaging scale of the information being effected by a displacement of the lens system relative to the display.

7. A warning device according to claim 1, further comprising a lens system arranged between the display and the windshield, the lens system having a displacable lens, a change in the imaging scale of the information being effected by a displacement of the lens within the lens system.

8. A warning device according to claim 7, further comprising an adjustment drive for moving the lens.

9. A warning device according to claim 6, further comprising a housing and at least one source of light disposed within the housing, the lens system being displaceably supported within the housing, the housing receiving the display developed as a diapositive, the at least one source of light being arranged behind the display, and the adjustment drive being mounted in the housing.

10. A warning device according to claim 9, wherein the housing is adapted to be mounted in an instrument panel of the vehicle.

11. A warning device according to claim 1, further comprising a translucent display unit having a grid, the translucent display unit being arranged in the ray path between the display and the windshield.

12. A warning device according to claim 8, wherein the displacement of the lens by the adjustment drive adapts the warning device for indicating the distance of the vehicle from an object, particularly the distance of an automobile from another automobile traveling in front of it.

13. A warning device according to claim 11, wherein
   the translucent display comprises a cover glass with said grid being on the cover glass; and
   the grid of the translucent display unit is a grid of 50 to 100 meters.

14. A warning device according to claim 11, wherein the grid is mirrored as a virtual image within said visible region of said windshield, a size of the grid remaining constant during a changing of the size of the virtual image of the information.

* * * * *